(12) United States Patent
Anzai et al.

(10) Patent No.: US 8,321,642 B1
(45) Date of Patent: Nov. 27, 2012

(54) INFORMATION STORAGE SYSTEM, SNAPSHOT ACQUISITION METHOD, AND DATA STORAGE MEDIUM

(75) Inventors: Tomoya Anzai, Ebina (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 17 days.

(21) Appl. No.: 13/142,363

(22) PCT Filed: Jun. 2, 2011

(86) PCT No.: PCT/JP2011/003120
§ 371 (c)(1),
(2), (4) Date: Jun. 27, 2011

(51) Int. Cl.
*G06F 12/00* (2006.01)
(52) U.S. Cl. .................................................... 711/161
(58) Field of Classification Search .................. None
See application file for complete search history.

(56) References Cited

U.S. PATENT DOCUMENTS

| 6,651,075 B1 | 11/2003 | Kusters et al. |
| 7,237,076 B2 | 6/2007 | Nakano et al. |
| 2006/0174075 A1 | 8/2006 | Sutoh |

FOREIGN PATENT DOCUMENTS

EP 1804167 A2 7/2007

*Primary Examiner* — Brian Peugh
(74) *Attorney, Agent, or Firm* — Volpe and Koenig, P.C.

(57) ABSTRACT

The information storage system of an aspect of the present invention includes a first differential data storage area which stores differential data of a higher volume from a first point of time to a second point of time, a lower snapshot manager which provides a lower snapshot at the second point of time of the higher volume, and a second differential data storage area which stores differential data of the higher volume after the second point of time. The higher snapshot manager acquires a plurality of generations of higher snapshots from the lower snapshot and the data in the first differential data storage area and acquires a plurality of generations of higher snapshots from the data of the higher volume and the data in the second differential data storage area.

15 Claims, 14 Drawing Sheets

Fig. 7

BLOCK COPY MANAGEMENT TABLE 301

| BLOCK ADDRESS | fs0-snap0 | | fs0-snap1 | | ... | fs0-snap(n-1) | |
|---|---|---|---|---|---|---|---|
| | VOLUME | BLOCK | VOLUME | BLOCK | | VOLUME | BLOCK |
| 0 | −1 | 32 | 0 | 0 | ... | NULL | NULL |
| ... | ... | ... | ... | ... | ... | ... | ... |
| t | −1 | 108 | −1 | 94 | ... | NULL | NULL |
| ... | ... | ... | ... | ... | ... | ... | ... |
| j−1 | −1 | 276 | 0 | 0 | ... | NULL | NULL |

Fig. 8

USED BLOCK MANAGEMENT TABLE 302

| BLOCK ADDRESS 801 | STATUS FLAG 802 |
|---|---|
| 0 | 1 |
| ⋮ | ⋮ |
| t | 1 |
| ⋮ | ⋮ |
| k−1 | 0 |

Fig. 10

| BLOCK ADDRESS | fs0-snap0 | | fs0-snap1 | | ... | fs0-snap(n-1) | |
|---|---|---|---|---|---|---|---|
| | VOLUME | BLOCK | VOLUME | BLOCK | | VOLUME | BLOCK |
| 0 | -1 | 32 | 5 | 0 | ... | 5 | 0 |
| ... | ... | ... | ... | ... | ... | ... | ... |
| t | -1 | 108 | -1 | 94 | ... | 5 | 0 |
| ... | ... | ... | ... | ... | ... | ... | ... |
| j-1 | -1 | 276 | 5 | 0 | ... | 5 | 0 |

301 BLOCK COPY MANAGEMENT TABLE

INFORMATION STORAGE SYSTEM, SNAPSHOT ACQUISITION METHOD, AND DATA STORAGE MEDIUM

TECHNICAL FIELD

The present invention relates to an information storage system, a snapshot acquisition method, and data storage media, specifically to snapshot acquisition in the information storage system.

BACKGROUND ART

In a server or a file server which provides a file sharing service, a technology referred to as a snapshot for acquiring an image of a volume of a file system at a certain point of time for the purpose of use in backup or recovery of a file or a file system exists (e.g. the Patent Literature 1, the Patent Literature 2).

By regularly acquiring a snapshot and mounting it at an appropriate location, even if a failure occurs in a file or a file system, the data can be recovered relatively easily by referring to the snapshot acquired when the file or file system was normal.

As for a snapshot, a differential snapshot which retains only differential data of updated data blocks is common, instead of a copy of the entire data. An image of a virtual volume of the file system can be configured from the differential data and the original data by using a management table.

A snapshot technique is known which provides snapshots of a volume in a storage system where block data communication is provided as well as in the server where a file service is provided.

While the number of snapshots which can be acquired usually has an upper limit, there is a request recently for acquiring and retaining a larger number of snapshots over the upper limit due to the background that it is desired to retain these snapshots for a long period and to acquire the snapshots at a shorter interval.

CITATION LIST

Patent Literature

PTL 1: U.S. Pat. No. 7,237,076
PTL 2: U.S. Patent Application Publication No. 2006/174075

SUMMARY OF INVENTION

Technical Problem

For acquiring and retaining snapshots, for example, a management table such as a block copy management table in FIG. 3 of the Patent Literature 1 is utilized. Although this management table is usually stored in the storage area of a non-volatile storage device such as a disk drive and others, the entire management table is retained in the memory and utilized for the processing during the operation of the server for performing the snapshot processing at a high speed and because the update processing of the entire management table might occur. The updated part is synchronized with the management table stored in a disk device or others each time the table is updated or regularly.

Since the block copy management table includes columns which are proportional to the number of snapshots, the size of this management table also increases if the number of snapshots is simply increased. There is a problem that the used amount of the memory during the operation increases for the above-mentioned reason. Furthermore, as the size of the management table increases, the processing time for reading from and writing to the management table increases, which requires time for the update processing of the entire management table.

Furthermore, if the snapshots of the server and the snapshots of the storage system are simply combined, at most only the sum of the number of snapshots which each of the above can acquire can be acquired.

One of the purposes of the present invention is to provide a method for significantly increasing the number of snapshots which can be acquired and retained while maintaining the used amount of the memory accompanying the increase of the number of snapshots at a low level.

Solution to Problem

The information storage system as an aspect of the present invention comprises a first differential data storage area which stores differential data due to the update of a higher volume from a first point of time to a second point of time, a lower snapshot manager which provides a lower snapshot at the second point of time of the higher volume, first management information which associates the first differential data storage area with the lower snapshot, a second differential data storage area which stores differential data due to the update of the higher volume after the second point of time, second management information which associates the second differential data storage area with the higher volume, and a higher snapshot manager which acquires a plurality of generations of higher snapshots from the lower snapshot and data in the first differential data storage area with reference to the first management information, and acquires a plurality of generations of higher snapshots from data of the higher volume and data in the second differential data storage area with reference to the second management information.

Advantageous Effects of Invention

According to an aspect of the present invention, the number of snapshots which can be acquired and retained can be increased compared with the conventional snapshot function. The other problems, configurations and effects than explained above are disclosed by the explanation of the embodiments below.

BRIEF DESCRIPTION OF DRAWINGS

FIG. 7 is a diagram showing an example of a block copy management table in the server in the present embodiment.

FIG. 8 is a diagram showing an example of a used block management table of the server in the present embodiment.

FIG. 10 is a diagram showing an example of the block copy management table of the server after changing the association in the present embodiment.

DESCRIPTION OF EMBODIMENTS

The embodiments of the present invention are explained below. For clarifying the explanation, some part of the description and figures below are appropriately omitted and simplified. Furthermore, in each of the figures, the same reference sign is given to the same component, and overlapping explanation is omitted as needed for the clarification of the explanation.

The information storage system of the present embodiment comprises a multi-hierarchy snapshot function including a higher snapshot function and a lower snapshot function. The higher snapshot function is a differential snapshot function. The lower snapshot function is a differential snapshot function or another snapshot function.

The lower snapshot function creates a plurality of snapshots from an operation volume. The higher snapshot function can configure a plurality of snapshots from one snapshot provided by the lower snapshot function. The number of snapshots can be increased by this multi-hierarchy snapshot function.

The configuration explained below includes a server system (typically a file server (file storage) system) comprising the snapshot function and a storage system (typically a block storage system) which provides volumes to the server system and comprises the snapshot function. The types of the server and the storage system are not specifically limited.

The storage system is a lower system providing the lower snapshot function. The storage system provides an operation volume to the server system, and also creates and provides the snapshots of the operation volume.

The server system is a higher system providing the higher snapshot function. The server system can create a plurality of generations of snapshots from the operation volume provided by the storage system. Furthermore, the server system can configure and create a plurality of generations of higher snapshots from the snapshots of the operation volume provided by the storage system.

One of the typical examples of the server system is a gateway-type network attached storage (NAS). The client computer accesses the server system and utilizes the file system (volumes) which the server system provides. The server system provides the operation volume and the snapshots to the client computer. Specifically speaking, the client computer can access the operation volume and the snapshots of the operation volume.

As explained above, in the present embodiment, the server system comprising the function of increasing the number of snapshots increases the number of snapshots by utilizing the snapshot function of the storage system. Hereinafter, following the explanation of the system configuration of the present embodiment with reference to the figures, the snapshot acquisition processing, the write processing to the operation volume, the snapshot read processing, and the snapshot deletion processing are explained.

Figure 1:
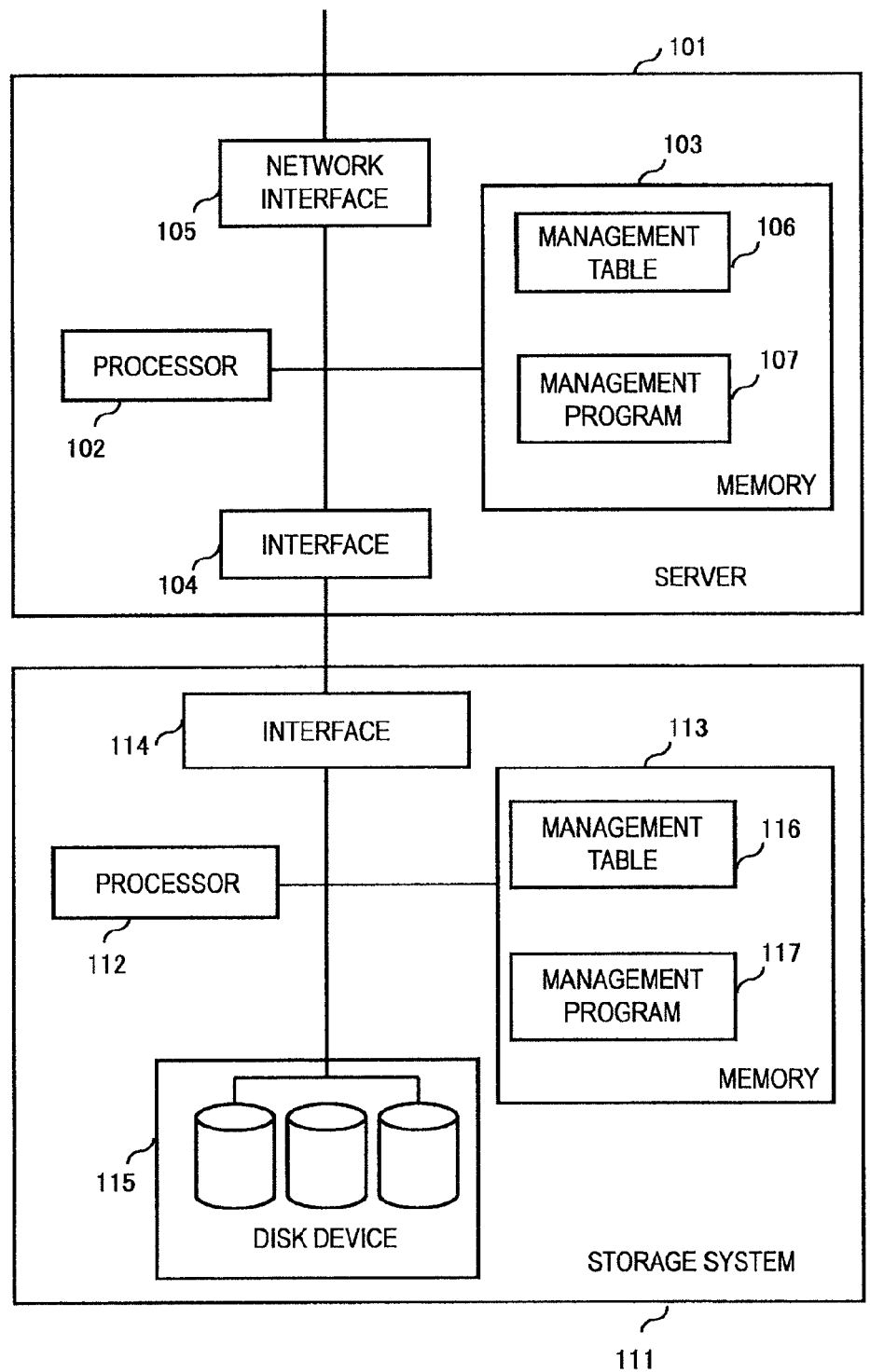
FIG. 1 is a diagram showing the system configuration example of an information storage system comprising a snapshot function of the present embodiment.

FIG. 1 is a diagram showing an example of the system configuration of the information storage system including a server computer (hereinafter referred to as a server) comprising the function of increasing snapshots of the present embodiment. The information storage system includes a server 101 and a storage system 111.

The server 101 includes a processor 102, a memory 103, which is a main storage device, an interface 104 with the storage system 111, and a network interface 105. The processor 102 performs all the processing performed in the server such as file system management and snapshot processing. The memory 103 temporarily stores data and a management table 106 and retains the management program 107 which is read from disks and others.

The processor 102 realizes specified functions by performing the program stored in the memory 103. The memory 103 stores the program performed by the processor 102 and the data required for performing the program. The program includes a management program 107 as well as an OS (Operating System) which is not shown in the figure. The processor 102 can include a plurality of chips and a plurality of packages.

The program performs specified processing by being performed by the processor 102 while using storage devices and communication ports (communication devices). Therefore, the explanation whose subject is a program in the present embodiment may also be the explanation whose subject is the processor 102. In other words, the processing performed by the program is the processing performed by the computer and the system in which the program operates.

The processor 102 operates as a functional unit for realizing a specified function by operating in accordance with the program. For example, the processor 102 functions as a management unit by operating in accordance with the management program 107, and functions as a server snapshot unit (snapshot management unit) by operating in accordance with a server snapshot program 201 (refer to FIG. 2). The same applies to other programs. The computer and the system are an apparatus and a system including these function units. At least a part of the programs may also be realized by dedicated hardware.

Although the management table 106 and the management program 107 are shown in the memory 103 for the convenience of the explanation, the programs and data are typically loaded from the storage area of a secondary storage device to the storage area of the memory 103. The secondary storage device is a storage device comprising a non-volatile, non-temporary storage media storing the programs and data required for realizing specified functions.

The secondary storage device may also be an external storage device connected via the network. The above explanation is also applied to the storage system 111. The programs and data can be installed in the apparatuses by a data distribution server or non-temporary storage media which can be read by the computer, and can be stored in the non-volatile storage device of each of the apparatuses.

The interface 104 with the storage system 111 performs the communication of data, instructions and responses with the storage system 111. The network interface 105 performs the communication of files and snapshot data with the client computer (not shown in the figure) and performs the communication of instructions and responses with the management computer (not shown in the figure) for managing the server.

The storage system 111 includes a processor 112, a memory 113, an interface 114 with the server 101, and a disk device 115. The processor 112 performs the processing performed in the storage system 111 such as the snapshot processing and the disk device management. The memory 113 temporarily stores the data and a management table 116 and retains the program 117 read from the disk and others.

The interface 114 with the server 101 performs the communication of data, instructions and responses with the server 101. The disk device 115 is provided as a volume image and stores all types of data. As for the disk device 115, as well as various types of hard disk drives (HDDs), any drive may be utilized such as a solid state drive (SSD) as long as the drive comprises media which can retain data.

Furthermore, although the volume is mostly in the form of a volume image usually divided from HDDs in the RAID configuration, the form is not limited to this, the volume image of the HDD itself, a volume image virtually divided from the pooled capacity, and others may also be used.

Although the server 101 and the storage system 111 are mostly connected by an Fibre Channel (FC) such as Storage Area Network (SAN), the network is not limited to this, the server 101 and the storage system 111 may be connected by any arbitrary network capable of data communication such as internet Small Computer System Interface (iSCSI), Fibre Channel over Ehernet (FCoE), and Infiniband.

Figure 2:
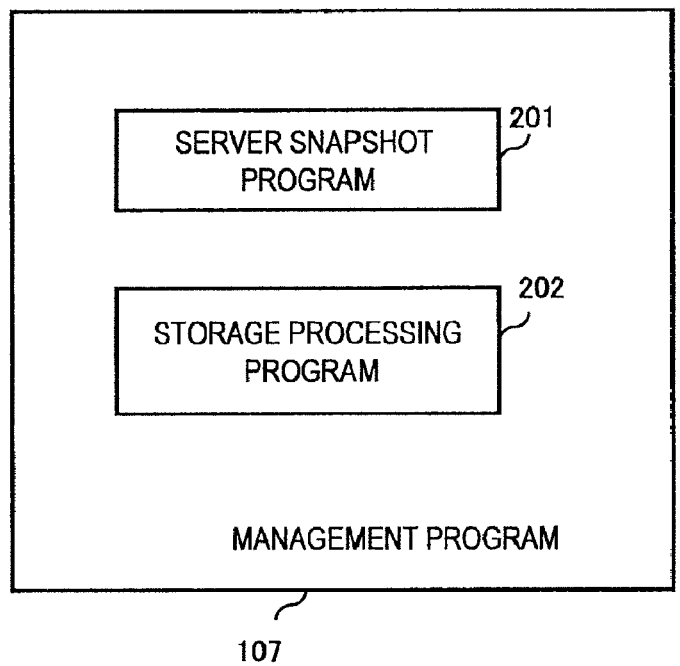
FIG. 2 is a diagram showing an example of the configuration of a management program of the server in the present embodiment.

FIG. 2 is a diagram showing an example of the configuration of the management program 107 of the server 101 in the present embodiment. The management program 107 includes a server snapshot program 201 and a storage processing program 202.

The server snapshot program 201 is a program which performs the processing related to snapshots in the server 101. The storage processing program 202 is a program which performs communication of data with the storage system 111, gives instructions related to snapshots to the storage system 111, and receives the responses to the above.

In addition to the above, there are also a program which performs communication of data with the client, a program which performs communication with the management computer, and others, but these programs are not directly related to the nature of the present embodiment and therefore are omitted from the explanation.

Figure 3:
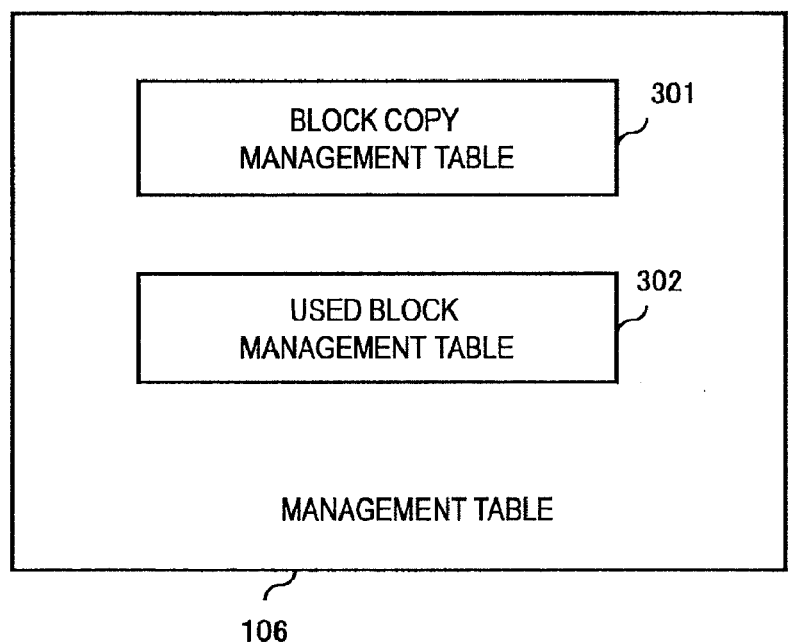
FIG. 3 is a diagram showing an example of the configuration of a management table of the server in the present embodiment.

FIG. 3 is a diagram showing an example of the configuration of a management table of the server in the present embodiment. The management table includes the information for managing snapshots. The management table 106 includes a block copy management table 301 and a used block management table 302. The block copy management table 301 and the used block management table 302 are the management tables utilized for the server 101 to acquire and retain snapshots. The details of these tables are explained later.

In the present embodiment, the information (e.g. snapshot management information) which the system (including the server 101 and the storage system 111) uses, for example, the management table 106 and the management table 116, may also be represented in any type of data structure independent of the data structure. For example, a data structure appropriately selected from a table, a list, a database, or a queue can store information. The information which the information storage system uses is stored in the data storage area in the data storage device.

Figure 4:
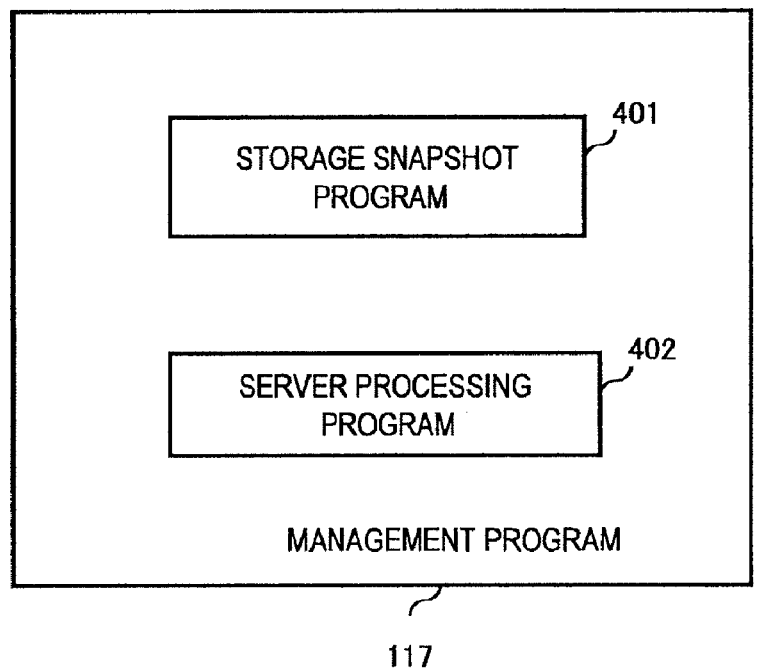
FIG. 4 is a diagram showing an example of the configuration of a management program of the storage system in the present embodiment.

FIG. 4 is a diagram showing an example of the configuration of the management program 117 of the storage system 111 in the present embodiment. The management program 117 includes a storage snapshot program 401 and a server processing program 402. The storage snapshot program 401 is a program for performing the processing related to snapshots in the storage system 111.

The server processing program 402 is a program which performs communication of data with the server 101, receives instructions related to snapshots from the server 101, and returns the responses to the above. In addition to the above, there are also a program which performs the management of the disk device 115 and volumes and others, a program which performs the communication with the management computer, and others, but these programs are not directly related to the nature of the present embodiment and therefore omitted from the explanation.

Figure 5:
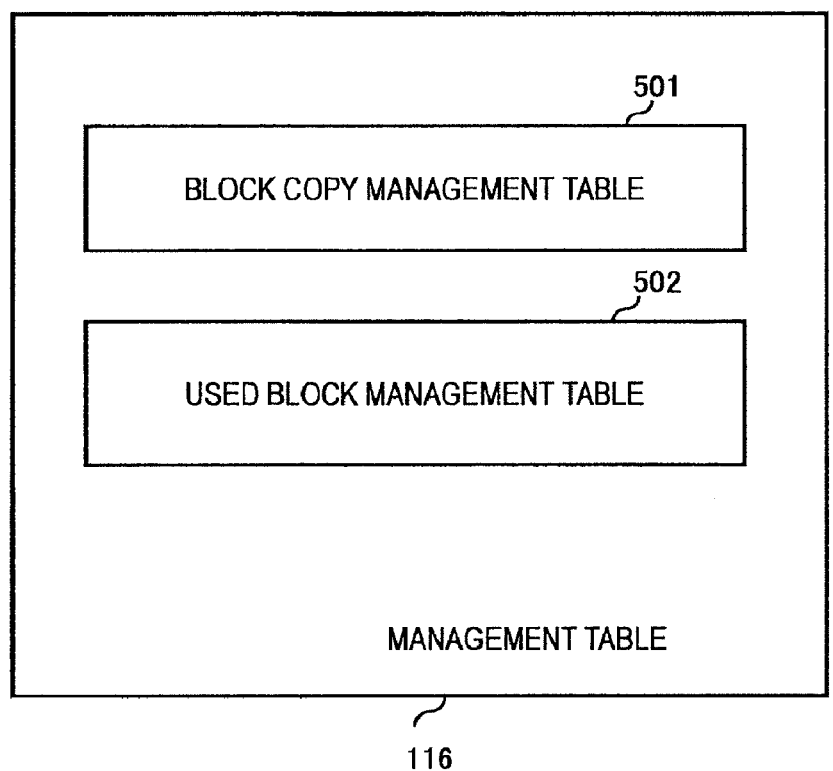
FIG. 5 is a diagram showing an example of the configuration of a management table of the storage system in the present embodiment.

FIG. 5 is a diagram showing an example of the configuration of the management table 116 of the storage system 111 in the present embodiment. The management table 116 includes a block copy management table 501 and a used block management table 502. The block copy management table 501 and the used block management table 502 are the management tables which the storage system 111 utilizes for acquiring and retaining snapshots. The details of these tables are explained later.

Figure 6:
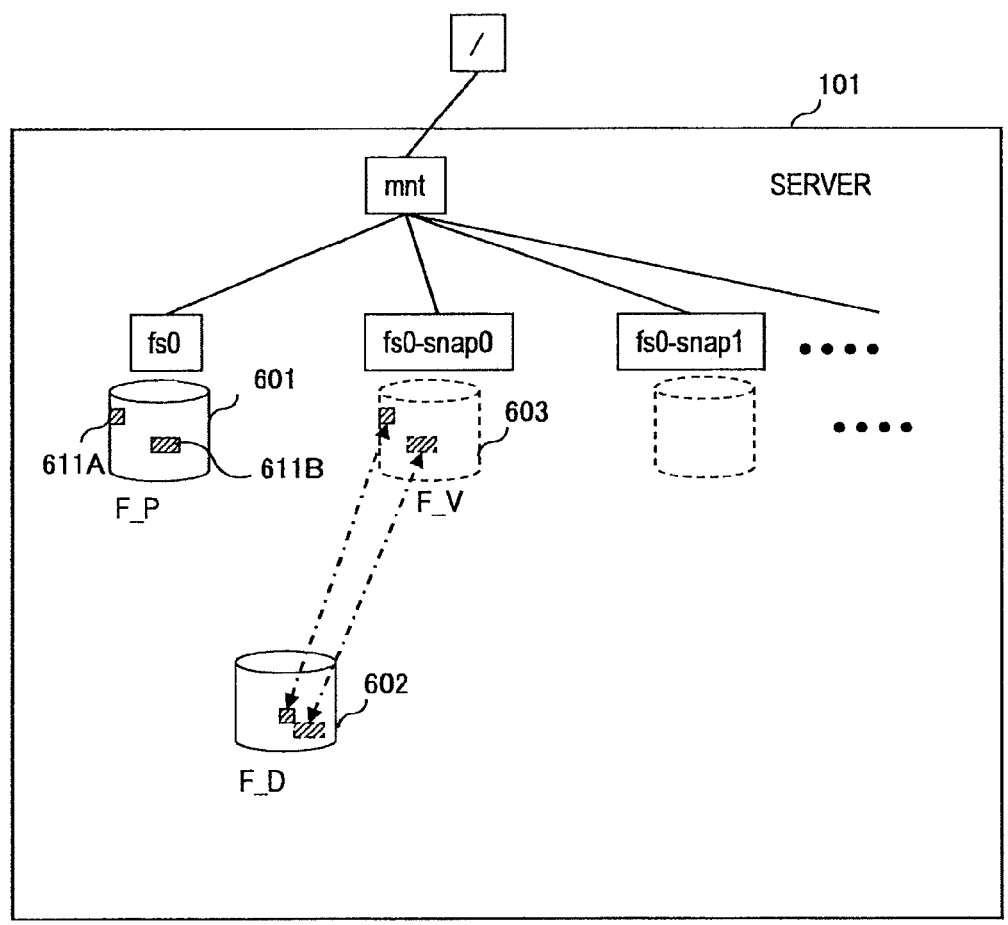
FIG. 6 is a diagram showing an example of the configuration of snapshots in the server in the present embodiment.

FIG. 6 is a diagram showing an example of the configuration of snapshots in the server 101. A file system "fs0" is configured in an operation volume 601 (an F_P volume) and is mounted under a directory "/mnt". The server 101 provides a file sharing service by publishing this file system "fs0" to the client computer (not shown in the figure). The entity data of the operation volume 601 is stored in the storage area of the storage system 111 in this configuration.

A snapshot which is a static image of this operation volume 601 at a certain point of time (a snapshot volume 603) is virtually configured of block data of a differential volume 602 and block data of the operation volume 601. Typically, the entity data of the differential volume 602 is stored in the storage area of the storage system 111.

The block is a data management unit in the storage system 111 and data access is performed in units of blocks. Snapshots are also managed in units of blocks in this configuration example. The information storage system may also manage the snapshots in other units than blocks, for example, the information storage system may also manage the snapshots in units of chunks each of which is configured of a plurality of blocks.

The server 101 mounts the snapshot volume 603 which is a virtual volume under "/mnt" as "fs0-snap0" for example. The server 101 provides the snapshot of the file system to the client by publishing the snapshot volume 603 to the client.

In the example of FIG. 6, if blocks 611A, 611B which are hatched parts in the operation volume 601 are to be updated after the server 101 acquires a snapshot "fs0-snap0", the server 101 updates the operation volume 601 after copying the data of the parts 611A, 611B to be updated to the differential volume 602.

If the client accesses the snapshot "fs0-snap0", the server 101 can generate the data (volume) at the time of acquiring the snapshot, that is, the snapshot of the operation volume 601, by acquiring the data of the part which was updated after acquiring the snapshot from the differential volume 602 and by acquiring the remaining data from the operation volume 601.

FIG. 7 is a diagram showing an example of the block copy management table 301 in the server 101 in the present embodiment. For acquiring and retaining the snapshot of the operation volume 601, the block copy management table 301 is associated with the operation volume 601 and the snapshot (the differential volume). Typically, the block copy management table 301 is stored in the differential volume 602 which is associated with the operation volume 601, read in the memory 103 to be utilized.

The block copy management table 301 includes a block address column 701 of the operation volume 601 and snapshot columns 702. Each of the snapshot columns 702 includes a volume column 703 and a block column 704. Each record comprises a field of the block address 701 of the operation volume 601, respective fields of the snapshot volumes 703, and respective fields of the snapshot blocks 704 which are mutually associated.

The number of snapshot columns 702 is the number of snapshots which can be acquired for the operation volume 601. Although the snapshot names are entered on the top of the snapshot columns 702 in the example of FIG. 7, an arbitrary value can be set as long as each of the snapshots can be uniquely identified.

Each of the fields of the block address columns 701 stores the address which uniquely identifies the block in the operation volume. Each of the fields in the volume columns 703 indicates whether the data which the value of the block address 701 of the record in the snapshot identifies is the data of the operation volume 601, the data of the differential volume 602, or the data of the volume of the snapshot of the storage system 111 explained later.

The value of each of the fields in the block columns 704 indicates the block address where the data of the record is stored in the volume where the data is stored (except the operation volume). Specifically speaking, if the value of the volume 703 is "0", the value indicates that the data which the value of the block address 701 identifies is not updated, that is, that the data is in the operation volume 601. In this case, the value of the block 704 is also "0".

If the value of the volume 703 is "−1", the value indicates that the data which the value of the block address 701 identifies has been updated after the snapshot was acquired and has been copied to the differential volume 602. The block address of the differential volume 602 where the data is stored is stored in the field of the block 704.

Furthermore, as explained later, if the value of the volume 703 is any of the values "from 1 to m", the value indicates that the data is the data of the volume of the snapshot of the storage system 111.

In the snapshot columns 702, at the time of initialization or when the snapshot is deleted, the initial value "NULL" is set for both the volume column 703 and the block column 704. Subsequently, if the server 101 acquires a snapshot, "0" is set for all the fields in both the volume column 703 and the block column 704. As no difference exists between the operation volume 601 and the snapshot immediately after the snapshot is acquired, all the snapshot data indicates the data of the operation volume 601 (that all the data is stored in the operation volume 601).

If the snapshot method in the storage system 111 is the differential snapshot method in which only differences are copied as in the server 101 in the present embodiment, the block copy management table 501 in the storage system 111 in FIG. 5 may be configured in the same manner as the block copy management table 301 of the server 101 shown in FIG. 7.

In the present embodiment, the snapshot method of the storage system 111 may be different from the differential snapshot method. For example, the snapshot may also be configured of all the data of the operation volume at a certain point of time (this is also referred to as a full snapshot method). The block copy management table 501 is not necessary in this configuration. The snapshot method of the storage system 111 is not specifically limited in the present embodiment.

FIG. 8 is a diagram showing an example of the used block management table 302 of the server 101 in the present embodiment. The used block management table 302 is associated with the operation volume 601 for acquiring and retaining the snapshots of the operation volume 601 as the block copy management table 301.

Typically, the used block management table 302 is stored in the differential volume 602 which is associated with the operation volume 601, read in the memory to be utilized. The server 101 utilizes the used block management table 302 for managing the block use status of the differential volume 602.

The used block management table 302 comprises a block address column 801 and a status flag column 802, and associates a value in the status flag column 802 with a value in the block address column 801 in the differential volume 602. In this example, if the value of the field of the status flag column 802 is "0", the value indicates that the block of the same record is not utilized. If the value of the field of the status flag column 802 is "1", the value indicates that the block is utilized, that is, that the differential data due to the update after acquiring the snapshot is stored in the block.

If the snapshot method in the storage system 111 is the differential snapshot method in which only differences are copied as in the server 101 in the present embodiment, the used block management table 502 in the storage system 111 in FIG. 5 may be configured in the same manner as the used block management table 302 of the server 101 shown in FIG. 8. As explained above, the snapshot method of the storage system 111 may be different from the differential snapshot method in the present embodiment. For example, if the storage system 111 has the full snapshot function, the used block management table 502 is not necessary.

Figure 9:
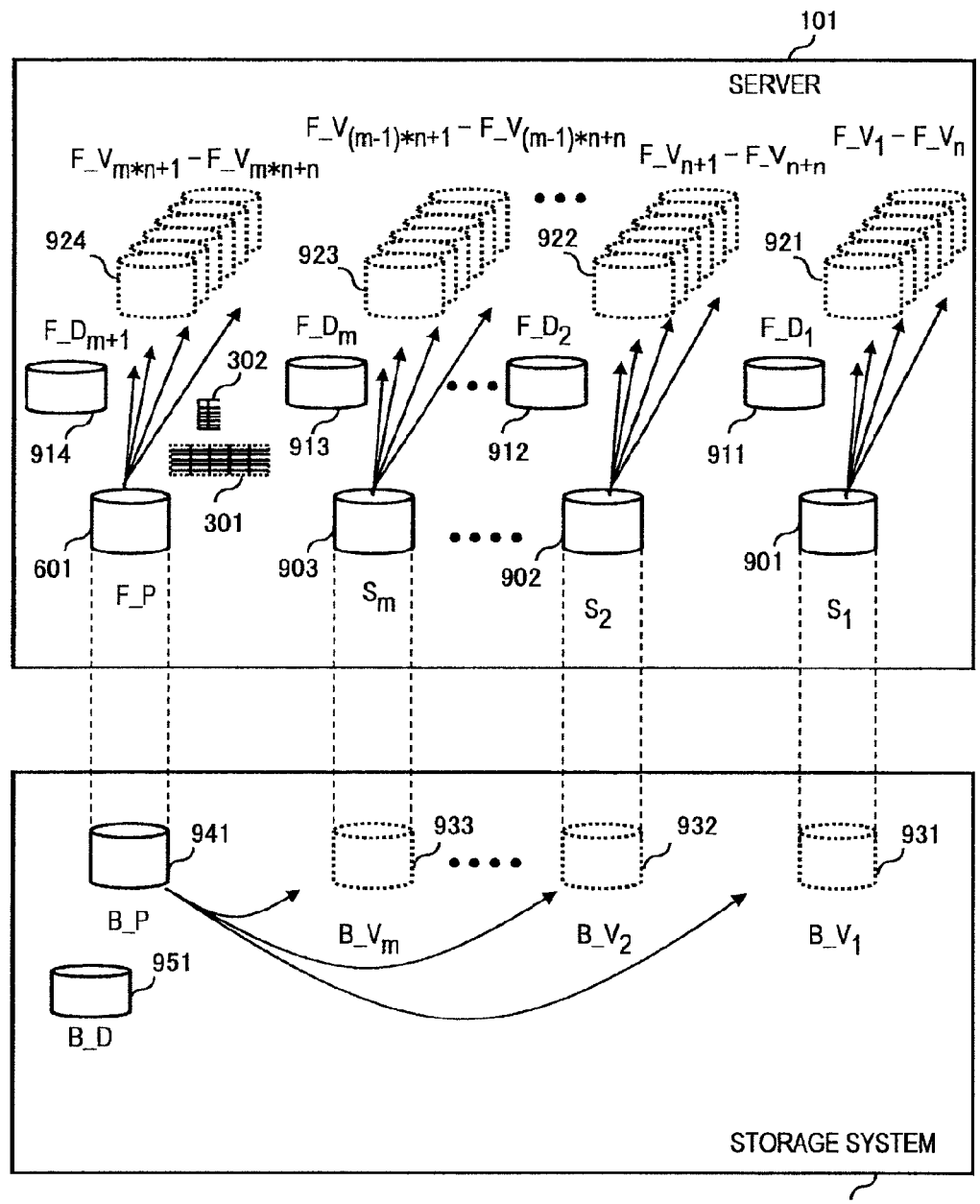
FIG. 9 is a diagram showing an example of the system configuration comprising a function of increasing the number of snapshots in the present embodiment.

FIG. 9 is a diagram showing an example of the configuration of the information storage system which performs the method for increasing the number of snapshots in the present embodiment. The server 101 is a gateway-type NAS for example, and the operation volume 601 (the F_P volume) in the server 101 is a virtual volume corresponding to the operation volume 941 (the B_P volume) which the storage system 111 published (provided) to the server 101.

The client recognizes and accesses the virtual operation volume 601 (file system) which the server 101 provides. The server 101 accepts the access from the client to the operation volume 601 (data read or data write), and accesses the entity operation volume 941 in the storage area of the storage system 111 in accordance with the access.

The storage system 111 can create m generations of snapshots (snapshot volumes) for the operation volume 941 (the B_P volume). FIG. 9 concretely illustrates a first generation snapshot volume 931 (the $B\_V_1$ volume), a second generation snapshot volume 932 (the $B\_V_2$ volume), and an m-th generation snapshot volume 933 (the $B\_V_m$ volume).

In this example, the snapshot method of the storage system 111 is the differential snapshot method, and the storage system 111 has a differential volume 951. The storage system 111 refers to the block copy management table 501 and the used block management table 502, and creates snapshots (snapshot volumes) from the operation volume 941 and the differential volume 951.

The snapshot volume is a virtual volume. The storage system 111 refers to the block copy management table 501 in response to the access request to the snapshot volume, and can identify the location where the data as the access destination is stored in the operation volume 941 or the differential volume 951.

The storage system 111 publishes these snapshot volumes (the $B\_V_1$ volume to the $B\_V_m$ volume) to the server 101. The server 101 publishes these as the snapshot volumes from 901 to 903 (the $S_1$ volume to the $S_m$ volume) in the server 101 to the client.

As explained above, m is the number (a positive integer) of generations of snapshots which can be acquired in the storage system 111. The processing for the access by the client to the snapshot volumes from 901 to 903 is the same as the processing for the access by the server 101 to the operation volume 601.

Meanwhile, in the server 101, the differential volumes from 911 to 914 (the $F\_D_1$ volume to the $F\_D_{m+1}$ volume) are respectively associated with the snapshot volumes from 901 to 903 (the $S_1$ volume to the $S_m$ volume) and the operation volume 601. In the example of FIG. 9, the management tables 301, 302 stored in each of the differential volumes from 911 to 914 (the $F\_D_1$ volume to the $F\_D_{m+1}$ volume) retain n generations of snapshot volume groups. In the example of FIG. 9, the server 101 retains the snapshot volume groups from 921 to 924 (the $F\_V_1$ volume to the $F\_V_{(m+1)*n}$ volume) for the operation volume 601.

In FIG. 9, for example, the snapshot volume group 921 (the $F\_V_1$ volume to the $F\_V_n$ volume) is retained for the pair of the differential volume 911 and the snapshot volume 901. The snapshot volume group 922 (the $F\_V_{n+1}$ volume to the $F\_V_{2n}$ volume) is retained for the pair of the differential volume 912 and the snapshot volume 902.

The server 101 can acquire a group of n generations of snapshot voluemes (F_V volume group) from each of the pair of the differential volume (the F_D volume) and the snapshot volume (the S volume) and the pair of the differential volume (the F_D volume) and the operation volume 601, by referring to the corresponding management tables 301, 302.

n is the number (a positive integer) of generations of snapshots which can usually be acquired in the server 101, that is, the number of snapshots which can be managed by a pair of management tables 301, 302. Specifically speaking, the number indicates that n rows of snapshot columns 702 exist in the block copy management table 301.

Therefore, according to the method for increasing the number of snapshots in the present embodiment, up to $((m+1)*(n+1)-1)$ snapshots (snapshot volumes) can be acquired and retained for a single operation volume 601, including the snapshot volumes from 901 to 903 (the $S_1$ volume to the $S_m$ volume) which the storage system 111 publishes to the server 101.

The server 101 retains the block copy management table 301 and the used block management table 302 for retaining the snapshot volume group (the $F\_V_{m*n+1}$ volume to the $F\_V_{m*n+n}$) which are associated with the operation volume 601 in the memory 103.

Meanwhile, in the preferable configuration, among the block copy management tables 301 and the used block management tables 302 for retaining the snapshot volume groups (the $F\_V_1$ volume to the $F\_V_{m*n}$ volume) which are associated with the snapshot volumes from 901 to 903 (from the $S_1$ volume to the $S_m$ volume), the server 101 loads (the necessary information in) the corresponding management tables 301, 302 only in case the snapshot is accessed, from the disk device 115 of the storage system 111 to the memory 103.

Subsequently, if there is no access for the above-mentioned management tables 301, 302 (snapshots) for a certain period of time which is set in advance, the server 101 releases the above-mentioned management tables 301, 302 from the memory 103 (releases the areas of the memory 103 storing the above-mentioned management tables 301, 302).

The management table which was used for the conventional snapshot function (corresponding to the block copy management table 301 in the present embodiment) had to store the management information of the (m+1)*n snapshots for managing all the snapshots, and the conventional system had to retain the table of the size in the memory. For example, the conventional system had to retain the block copy management table 301 including (m+1)*n snapshot columns 702 in the memory in the block copy management table 301 of the present embodiment.

Meanwhile, the server 101 including the function of increasing the number of snapshots of the present embodiment has only to retain the block copy management table 301 including n snapshot columns 702, which is 1/(m+1) of the number of the conventional columns, in the memory 103 for accessing the snapshots. Therefore, the area which is occupied for the snapshot management in the memory 103 can be reduced.

The snapshot function of the present embodiment can reduce the capacity of the memory 103 required by the server 101 which manages the snapshots, and a large number of snapshots can be managed even in the system with a memory of a limited capacity. As the size of the block copy management table 301 is small, the deterioration of the processing speed in data registration and data search for the table due to the increase of the number of snapshots can be prevented.

As explained above, in the preferable configuration, the server 101 stores the management tables 301, 302 of the accessed snapshot in the memory 103 and releases the unnecessary management tables (the management tables of the snapshots which are not accessed) from the memory 103. By this method, the storage area of the memory 103 can be utilized for other kinds of processing and the memory area can be utilized more efficiently.

Although the management tables 301, 302 are stored in the corresponding differential volume in this example, the management tables 301, 302 may also be stored in the different area from the above. For example, the management tables 301, 302 may also be stored in another storage area in the storage system 111. In other cases, the server 101 may be equipped with a different non-volatile external storage device from the storage system 111 and store the management tables 301, 302 in the storage area of the storage device.

As explained above, in the preferable configuration, the server 101 loads (the necessary information in) the management tables 301, 302 of the snapshot in the memory 103 in response to the access request. Subsequently, if a certain period of time which is set in advance elapses without any access to the snapshot, the server 101 determines that the access to the snapshot is terminated, and releases the area storing the management tables 301, 302.

By this method, the more efficient memory utilization can be realized. The server 101 may also perform memory management by different methods from this. The timing or condition for releasing (the storage area of) the management tables 301, 302 (the condition for determining that the access for the snapshot is terminated) is appropriately defined by the design.

The operation volume 601 stores the data which is the newest in the server 101 in the example shown in FIG. 9. In accordance with the change of the operation volume 601, the server 101 stores the data before being changed in the differential volume 914, and subsequently changes the data of the operation volume 601.

The oldest snapshot volume in the snapshot volumes from 901 to 903 of the operation volume 601 published to the server 101 is the snapshot volume 901. The snapshot volume 902 is the next oldest snapshot volume, and furthermore the snapshot volume 903 is the newest snapshot volume.

The server 101 stores the differential data corresponding to n generations of snapshots from the operation volume 601 in the differential volume F_D (e.g. the differential volume 911), stores the management data corresponding to the n generations of snapshots in the management tables 301, 302, and subsequently creates a new snapshot volume S (e.g. a snapshot volume 901) by utilizing the snapshot function of the storage system 111.

The server 101 updates the management tables 301, 302 which associate the operation volume 601 with the differential volume F_D (e.g. the differential volume 911) to associate the newly created snapshot volume S (e.g. the snapshot volume 901) with the differential volume F_D (e.g. the differential volume 911).

The server 101 prepares a new differential volume F_D (e.g. the differential volume 912) and new management tables 301, 302, and stores the data for creating a snapshot of the operation volume 601 in the above. By repeating these processes, the server 101 acquires and manages m generations of snapshot volumes S and n generations of snapshot volumes F_V of the respective snapshot volumes S.

FIG. 10 is a diagram showing an example of the block copy management table 301 of the server after changing the association in the present embodiment. Since the block copy management table 301 shown in FIG. 10 is nearly the same as the block copy management table explained in FIG. 7, only the differences are explained below.

If the value of the field of the volume 703 in the snapshot column 702 in the block copy management table 301 in FIG. 7 is "0", the value indicates that the data of the entry is the data of the operation volume 601, while the case where the value is "−1" indicates that the data of the entry is the data of the differential volume 602 (refer to FIG. 6).

Meanwhile, in FIG. 10, if the value of the field of the volume 703 is any of the values from "1 to m", the value indicates that the destination of the association of the differential volume 602 and the snapshot group related to the data of the entry has been changed from the operation volume 601 to any volume of the snapshot volumes (the $S_1$ volume to the $S_m$ volume) which the storage publishes. Specifically speaking, a generation number (any of the numbers from 1 to m) of the snapshot volume (the $S_1$ volume to the $S_m$ volume) whose association has been changed is set for the field of the volume 703 instead of "0".

By this method, the block of the entry whose value of the field of the volume column 703 is "−1" in any of the snapshots in the snapshot volume group can be reconfigured by reading the data indicated by the block column 704 in the associated differential volume. The block of the entry whose value of the field of the volume column 703 is a number other than the above can be reconfigured by reading the data of the block indicated by the block address column 701 of the one of the snapshot volumes 901 to 903 (the $S_1$ volume to the $S_m$ volume) indicated by the number.

As referred to in the explanation of FIG. 9, the block copy management table 301 and the used block management table 302 for retaining the snapshot volume (F_V) group associated with the operation volume 601 are retained in the memory 103.

Meanwhile, (the necessary information in) the block copy management table 301 and the used block management table 302 for retaining the snapshot volume (F_V) group associated with any one of the snapshot volumes (from the $S_1$ volume to the $S_m$ volume) are read into the memory 103 only if the snapshots are accessed, and are released from the memory 103 if there is no access for a certain period of time afterwards.

Figure 16:
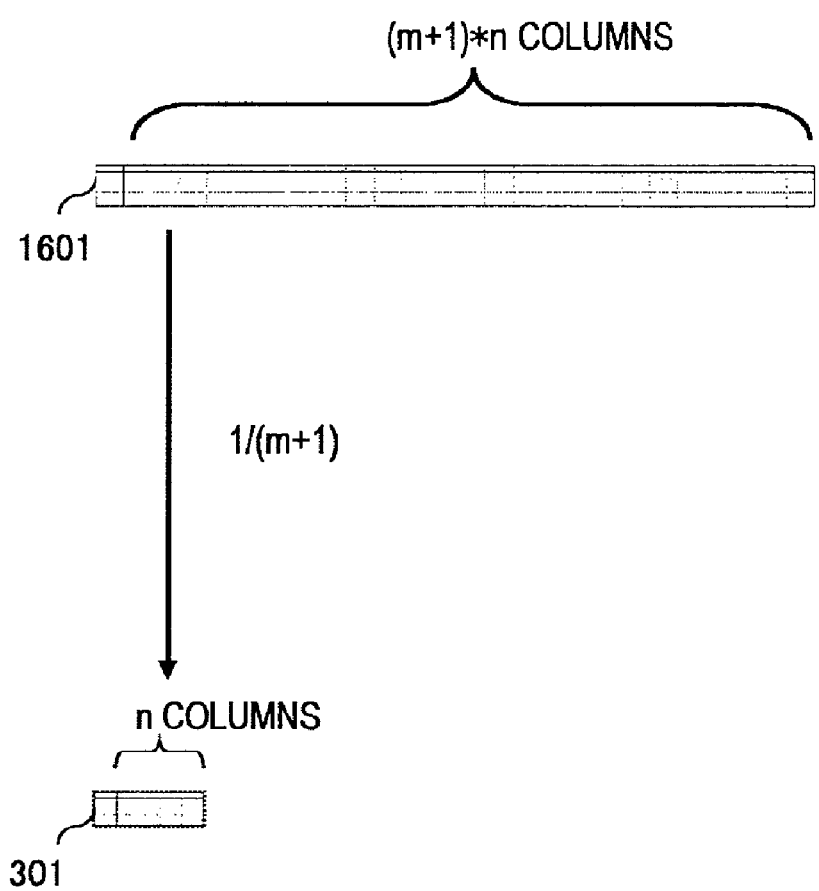
FIG. 16 is a diagram showing a comparison of the data amounts which must be retained in the memory of the server between the present embodiment and the conventional technology.

FIG. 16 is a diagram showing a comparison of the data amounts which must be retained in the memory of the server between the present embodiment and the conventional technology. If the conventional snapshot function uses the same type of block copy management table as in the present embodiment, the conventional snapshot function must retain a block copy management table 1601 of the size including (m+1)*n rows for storing the data of all of the (m+1)*n snapshots in the memory as shown in FIG. 16.

Meanwhile, by the method for increasing the number of snapshots of the present embodiment, it is only required to retain the block copy management table 301 including 1/(m+1) of the conventional number, which is n snapshot columns 702, in the memory as shown in FIG. 16.

Hereinafter, the snapshot acquisition processing, the operation volume write processing, the snapshot read processing, and the snapshot deletion processing are explained mainly with reference to FIGS. 11 to 15.

Snapshot Acquisition Processing

Figure 11:
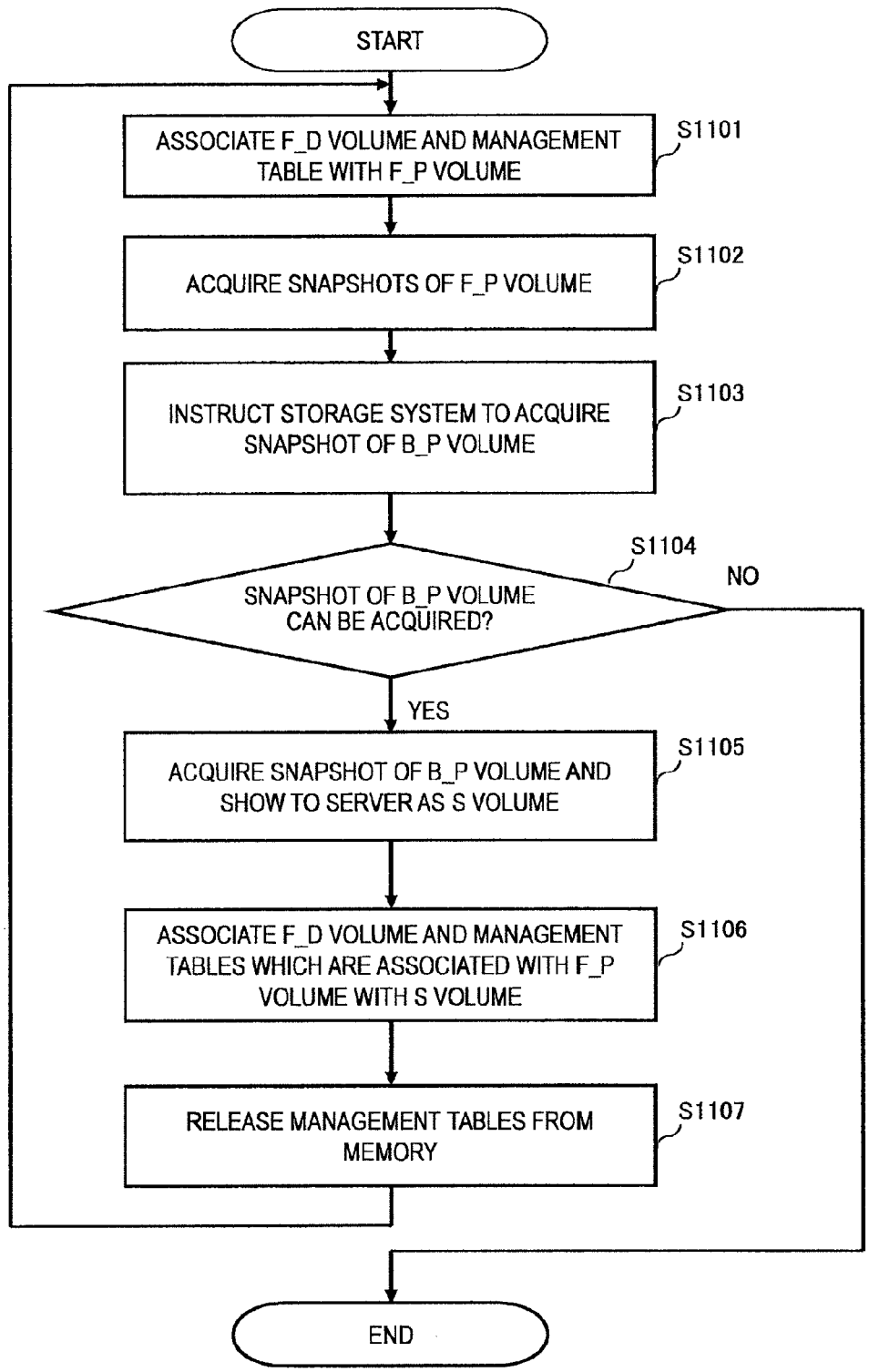
FIG. 11 is a flowchart showing an example of a snapshot acquisition operation of the server in the present embodiment.
Figure 12:
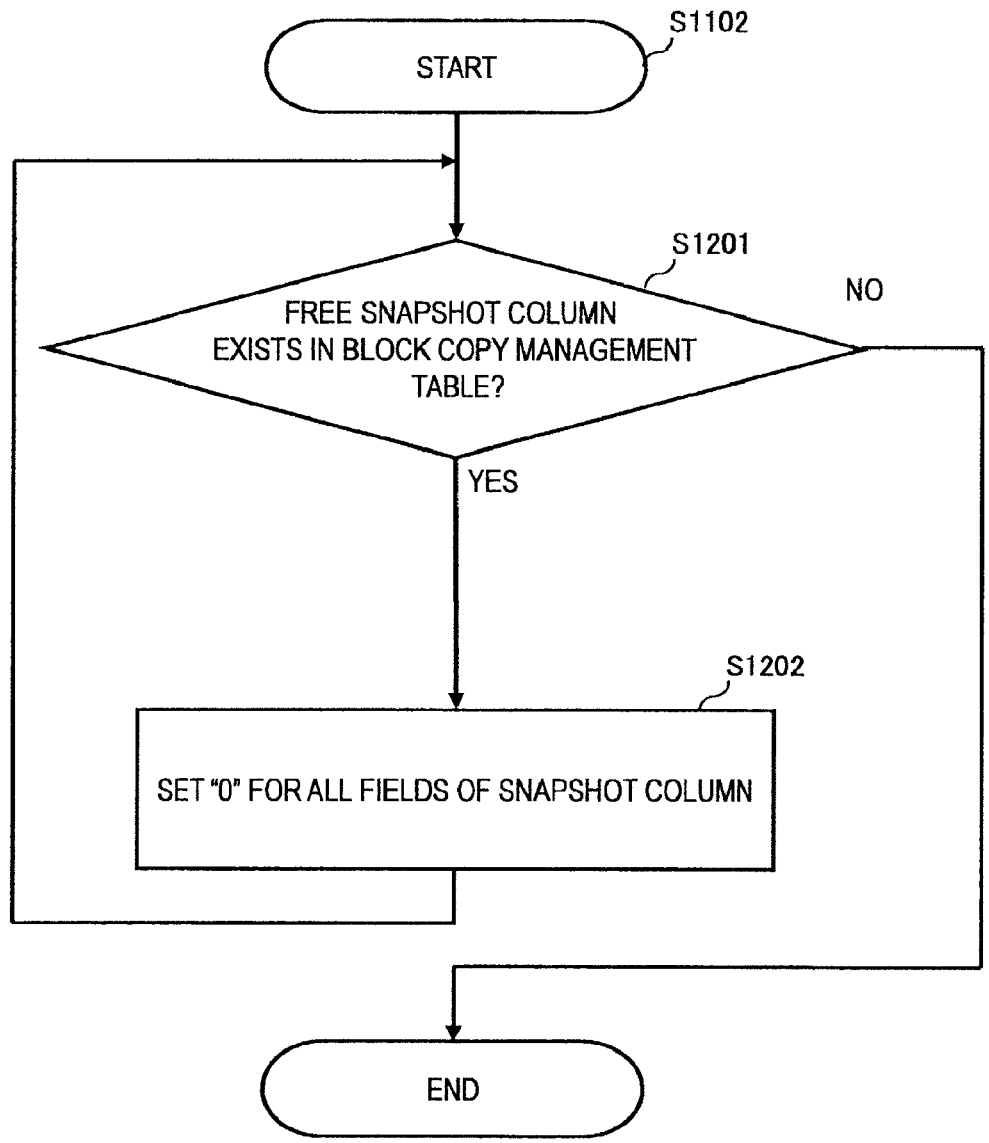
FIG. 12 is a flowchart showing an example of a snapshot acquisition step of an F_P volume in FIG. 11.

The snapshot acquisition processing is explained mainly with reference to FIG. 11 and FIG. 12. FIG. 11 is a diagram showing an example of the snapshot acquisition operation by the server 101 in the present embodiment. The details are explained later. FIG. 12 is a diagram showing an example of the operation at the step S1102 in FIG. 11. The details are explained later.

As shown in the flowchart in FIG. 11, the server snapshot program 201 of the server 101 firstly associates the differential volume 602 (the F_D volume), the block copy management table 301, and the used block management table 302 with the operation volume 601 (the F_P volume), and reads the block copy management table 301 and the used block management table 302 into the memory 103 (S1101).

The block copy management table 301 includes n generations of snapshot columns 702, and "NULL" is set for all of the fields in the initial status. Furthermore, in the used block management table 302, "0" is set for all of the fields of the status flag 802 in the initial status. If the differential volume 602 (the F_D volume) is already associated with the operation volume 601, the server snapshot program 201 skips this step.

Next, the server snapshot program 201 acquires n generations of snapshots of the operation volume 601 in the server 101 (S1102). The details of this step are explained with reference to FIG. 12.

Firstly, the server snapshot program 201 checks whether any free column, that is, a column whose fields of the volume 703 and the block 704 are all "NULL" exists or not among the snapshot columns 702 in the block copy management table 301 (S1201). If a free snapshot column 702 exists (S1201: YES), the server snapshot program 201 selects one free snapshot column 702, sets "0" for all the fields of the volume 703 and the block 704 (S1202), and returns to the step S1201.

If no column whose fields of the volume 703 and the block 704 are all the initial value "NULL" exists (S1201: NO), that is, n generations of snapshots are already acquired, the server snapshot program 201 proceeds to the next step (S1103).

Next, the server snapshot program 201 instructs the storage system 111 via the storage processing program 202 to acquire the snapshot of the operation volume 941 (the B_P volume) which is the entity volume of the operation volume 601 and publish it to the server 101 (S1103).

In the storage system 111, the server processing program 402 receives the above-mentioned instruction from the server 101, and passes it to the storage snapshot program 401. The storage snapshot program 401 checks whether a snapshot can be acquired or not (S1104).

If the snapshot can be acquired (S1104: YES), the storage snapshot program 401 acquires the snapshot (one of the $B\_V_1$ volume to the $B\_V_m$ volume) of the operation volume 941 (the B_P volume) and publishes it to the server 101 (S1105). The published snapshot (one of the $B\_V_1$ volume to the $B\_V_m$ volume) is published to the client as a snapshot volume (one of the $S_1$ volume to the $S_m$ volume) in the server 101.

If no snapshot can be acquired in the storage system 111 (S1104: NO), that is, if m generations of snapshots which can be acquired in the storage system 111 are already acquired, the snapshot acquisition processing is terminated. At this step, $((m+1)*(n+1)-1)$ generations of snapshots are already acquired.

Next, as explained with reference to FIG. 10, in the server 101, the server snapshot program 201 changes the destination of the association of the differential volume (one of the $F\_D_1$ volume to the $F\_D_{m+1}$ volume) associated with the operation volume 601 and the n generations of snapshots which are acquired most recently.

Specifically speaking, the server snapshot program 201 changes the destination of the association of the above-mentioned differential volume and the n generations of snapshots from the operation volume 601 to the snapshot volume (one of the $S_1$ volume to the $S_m$ volume) published from the storage system 111 at the previous step S1105 (S1106). By this change of the association, the management tables 301, 302 are also newly associated with the snapshot volume (one of the $S_1$ volume to the $S_m$ volume).

Specifically speaking, as shown in FIG. 9, the server snapshot program 201 refers to the block copy management table 301 of the differential volume (one of the $F\_D_1$ volume to the $F\_D_{m+1}$ volume) and the snapshot group, and replaces the values of all the fields with the value "0" in each of the volume columns 703 by the generation number of the snapshot volume (one of the $S_1$ volume to the $S_m$ volume). This generation number is the generation number of the snapshot volume with which the differential volume and the snapshots (management tables) are newly associated and which is provided by the storage system 111.

Specifically speaking, the server snapshot program 201 changes it so that the block of the snapshot (the F_V volume) which indicated the operation volume 601 (whose value of the field of the volume 703 is "0") indicates the snapshot volume (one of the $S_1$ volume to the $S_m$ volume) (the value of the field of the volume 703 is the generation number).

For example, in the example of FIG. 10, in the snapshot "fs0-snap1", as the value of the field of the volume 703 is "5" in the entry whose block address is "0" and in the entry whose block address is "j−1", it can be ascertained that (the data blocks of) these entries are changed to be associated with the fifth generation snapshot volume (the $S_5$ volume) provided from the operation volume 601 by the storage system 111.

Finally, the server snapshot program 201 releases the management tables 301, 302 which are newly associated with the snapshot volume (one of the $S_1$ volume to the $S_m$ volume), that is, the management tables 301, 302 whose association with the operation volume 601 is released, from the memory 103 (S1107).

This is because the access to the n generations of snapshots is only the read processing, and the update processing, that is, the update processing of the block copy management table 301 does not occur, and the table does not have to reside in the memory 103. Therefore, the server 101 has only to retain n generations of block copy management table 301 and the used block management table 302 associated with the operation volume 601 in the memory 103.

Subsequently, the server snapshot program 201 returns to the initial step (S1101), and the server 101 and the storage 111 repeat the above-mentioned steps. For example, in the example of FIG. 9, on the assumption that the number of snapshots which can be acquired in one pair of the block copy management table 301 and the used block management table 302 in the server 101 is n generations and that the number of snapshots which can be acquired in the storage system 111 is m generations, the procedure is as explained below.

1) The $F\_D_1$ volume 911 is associated with the F_P volume 601.
2) n generations of snapshots, the $F\_V_{1\,to\,n}$ volumes 921 are acquired.
3) The snapshot of the B_P volume 941, the $B\_V_1$ volume 931, is acquired and published to the server 101 as the $S_1$ volume 901.
4) The association of the $F\_D_1$ volume 911 is changed from the F_P volume 601 to the $S_1$ volume 901.
5) The $F\_D_2$ volume 912 is associated with the F_P volume 601.
6) n generations of snapshots, the $F\_V_{n+1}$ to $F\_V_{2n}$ volumes 922 are acquired.
7) The snapshot of the B_P volume 941, the $B\_V_2$ volume 932, is acquired and published to the server 101 as the $S_2$ volume 902.
8) The association of the $F\_D_2$ volume 912 is changed from the F_P volume 601 to the $S_2$ volume 902. Hereinafter, similarly, the processing is repeated until m generations of snapshots are acquired in the storage system 111.
9) The snapshot of the B_P volume 941, the $B\_V_m$ volume 933, is acquired and published to the server 101 as the $S_m$ volume 903.
10) The association of the $F\_D_m$ volume 913 is changed from the F_P volume 601 to the $S_m$ volume 903.
11) The $F\_D_{m+1}$ volume 914 is associated with the F_P volume 601.
12) n generations of snapshots, the $F\_V_{m*n+1}$ to $F\_V_{m*n+n}$ volumes 924 are acquired.

Operation Volume Write Processing

Figure 13:
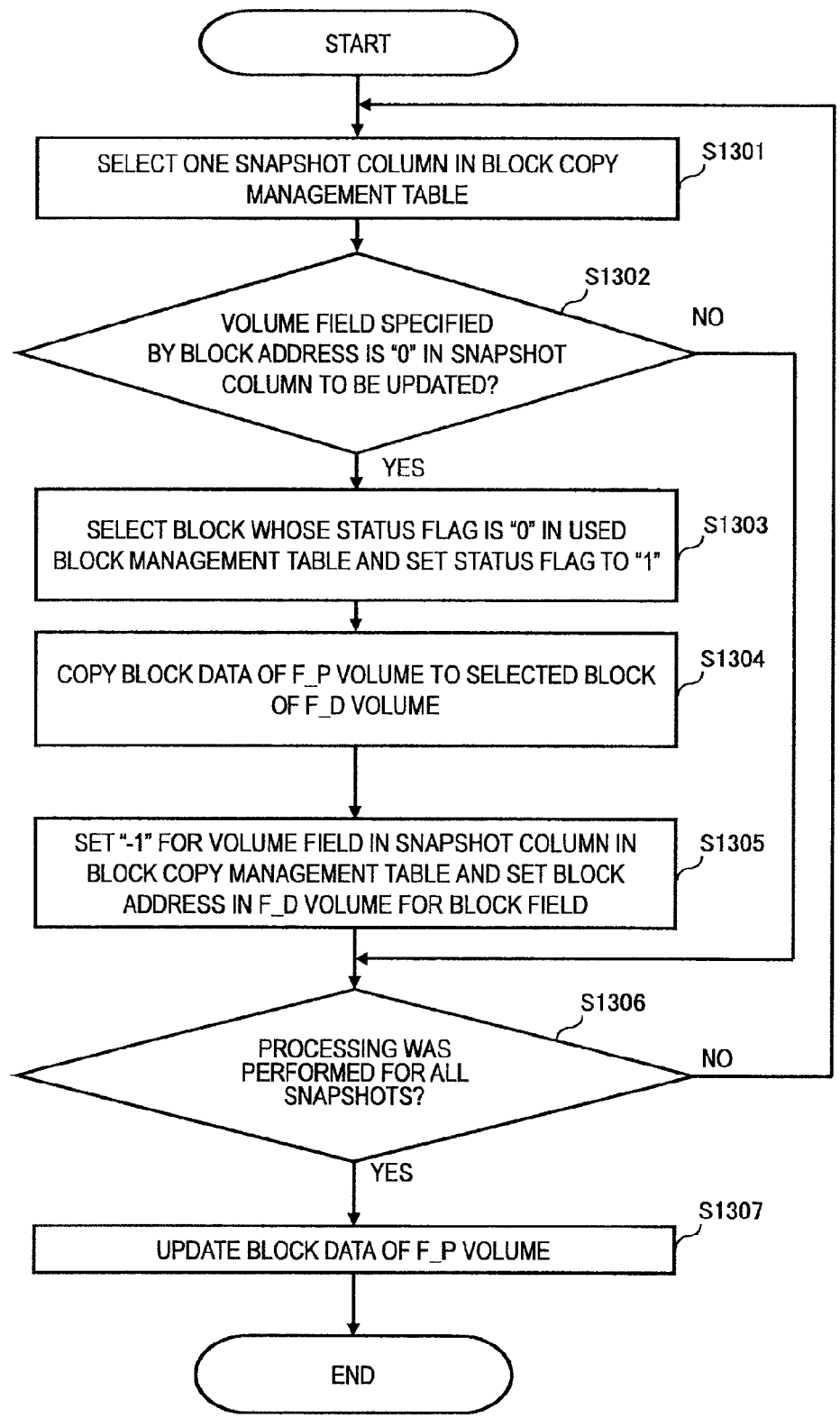
FIG. 13 is a flowchart showing an example of a write operation of the server to an operation volume in the present embodiment.

The operation volume write processing is explained mainly with reference to FIG. 13. FIG. 13 is a flowchart showing an example of the write operation of the server 101 to the operation volume 601 in the present embodiment. If data is written to the operation volume 601 after acquiring the snapshot, the copy processing of the differential data to the differential volume 602 occurs, and the update processing occurs for the block copy management table 301 and the used block management table 302 for managing n generations of snapshots associated with the operation volume 601.

Firstly, if there is a write request from the client to a certain block address 701, the server snapshot program 201 selects one snapshot column 702 in the block copy management table 301 (S1301). The program 201 checks whether the value of the field of the volume 703 corresponding to the field of the block address 701 to which data is written in the snapshot column 702 (in the same entry as the field of the block address 701) is "0" or not (S1302).

If the value is "0" (S1302: YES), the server snapshot program 201 refers to the used block management table 302 and selects a free block of the differential volume 602 for copying the data of the above block address 701 in the operation volume 601 to the differential volume 602. Specifically speaking, the server snapshot program 201 selects a block whose value of the status flag 802 is "0" from the used block management table 302, and changes the value of the status flag 802 to "1" (S1303).

If the field of the volume 703 corresponding to the field of the block address 701 to which data is written is not "0" in the snapshot column 702 (S1302: NO), the server snapshot program 201 skips the steps to the step S1306.

Next, the server snapshot program 201 copies the data of the above block address 701 in the operation volume 601 to the block of the selected differential volume 602 (S1304).

If the copy is performed already, the server snapshot program 201 skips this step and proceeds to the next step.

Furthermore, the server snapshot program 201 changes the value of the field of the volume 703 corresponding to the field of the above block address 701 in the block copy management table 301 to "-1", and sets the stored block address of the differential volume 602 for the field of the block 704 (S1305).

The server snapshot program 201 checks whether the above-mentioned processing was performed for all the snapshots in the block copy management table 301 or not (S1306) and, if the processing was performed for all the snapshots (S1306: YES), performs data write to the operation volume 601 (S1307), and the processing is terminated. If the processing was not performed for all the snapshots (S1306: NO), the server snapshot program 201 returns to the initial step S1301 and repeats the subsequent steps.

Snapshot Read Processing

Figure 14:
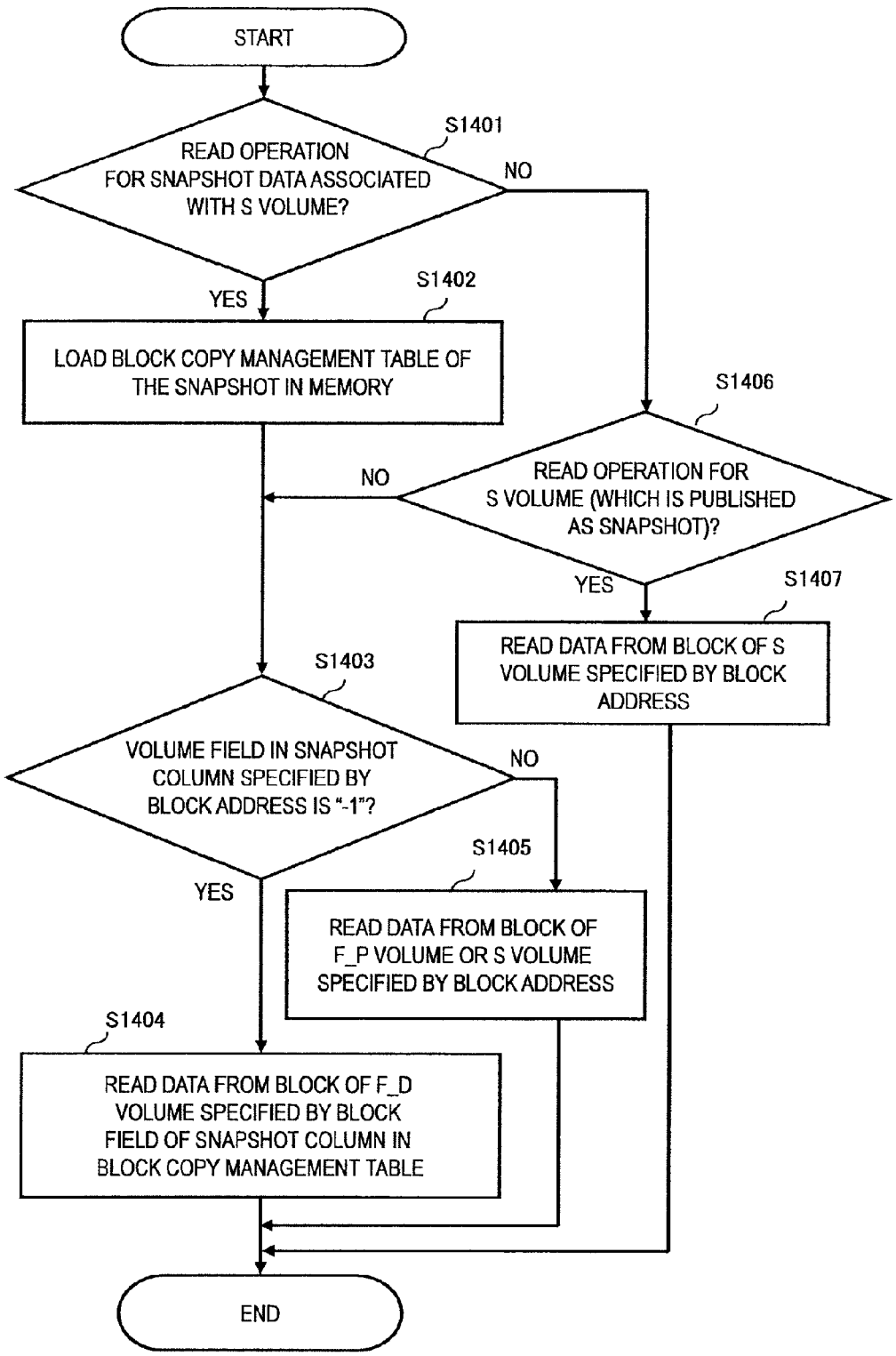
FIG. 14 is a flowchart showing an example of a snapshot read operation of the server in the present embodiment.

The snapshot read processing is explained mainly with reference to FIG. 14. FIG. 14 is a flowchart showing an example of the snapshot read operation of the server 101 in the present embodiment. After acquiring a snapshot, if an update is performed for the block (address) of the operation volume 601, the snapshot data is read from the saved differential volume 602, while the snapshot data is configured of the data of the operation volume 601 or of the snapshot volumes (one of the $S_1$ volume to the $S_m$ volume) whose association is changed if no update is performed.

Firstly, the server snapshot program 201 checks whether the snapshot volume which the client requested to read is a snapshot associated with a snapshot volume (one of the $S_1$ volume to the $S_m$ volume) or not (S1401).

For example, the server 101 comprises a table for associating the snapshot volumes ($S_1$ to $S_m$) with respective snapshot groups of the snapshot volumes ($S_1$ to $S_m$) and performs the above-mentioned check by referring to the table. This table comprises the address information of the management tables 301, 302 of each of the snapshot volumes S.

If the snapshot volume as the access destination is a snapshot which is associated with a snapshot volume (one of the $S_1$ volume to the $S_m$ volume) (S1401: YES), the server snapshot program 201 reads the block copy management table 301 which is associated with the snapshot volume (one of the $S_1$ volume to the $S_m$ volume) into the memory 103 (S1402).

If the snapshot volume is not a snapshot which is associated with a snapshot volume (one of the $S_1$ volume to the $S_m$ volume) (S1401: NO), the server snapshot program 201 checks whether the snapshot volume which the client requested to read is a snapshot volume (one of the $S_1$ volume to the $S_m$ volume) or not (S1406).

If the snapshot volume of the access destination is a snapshot volume (one of the $S_1$ volume to the $S_m$ volume) (S1406: YES), the server snapshot program 201 reads the data from the block of the S volume specified by the block address (S1407), and terminates the processing.

If the snapshot volume of the access destination is not any of the snapshot volumes ($S_1$ to $S_m$) (S1406: NO), the access destination is a snapshot associated with the operation volume 601 and the block copy management table 301 is already retained in the memory. The server snapshot program 201 skips S1402 and proceeds to the next process S1403.

The server snapshot program 201 checks whether the value of the field of the volume 703 in the snapshot column 702 corresponding to the block address 701 as the access target is "-1" or not (S1403). If the value of the field of the volume 703 is "-1" (S1403: YES), the server snapshot program 201 reads the data from the block address of the differential volume 602 which the field of the block 704 indicates (S1404).

If the value of the field of the volume 703 is not "-1" (S1403: NO) and if the value of the field of the volume 703 is "0", the server snapshot program 201 reads the data of the address of the operation volume 601 which the value of the field of the block address 701 indicates.

If the value of the field of the volume 703 is one of the values from "1 to m", the number of the value of the field of the volume 703 indicates the generation number of the snapshot volume (one of the $S_1$ volume to the $S_m$ volume) with which the block copy management table 301 is associated. Therefore, the server snapshot program 201 reads the data from the address indicated by the block address 701 in the associated snapshot volume (one of the $S_1$ volume to the $S_m$ volume) (S1405).

If there is no access to the above-mentioned snapshot volume for a certain period of time, the server snapshot program 201 releases the block copy management table 301 which the program read into the memory 103 at the step S1402 from the memory 103. The server snapshot program 201 repeats the above-mentioned processing for each of the blocks to which there is any access.

Snapshot Deletion Processing

Figure 15:
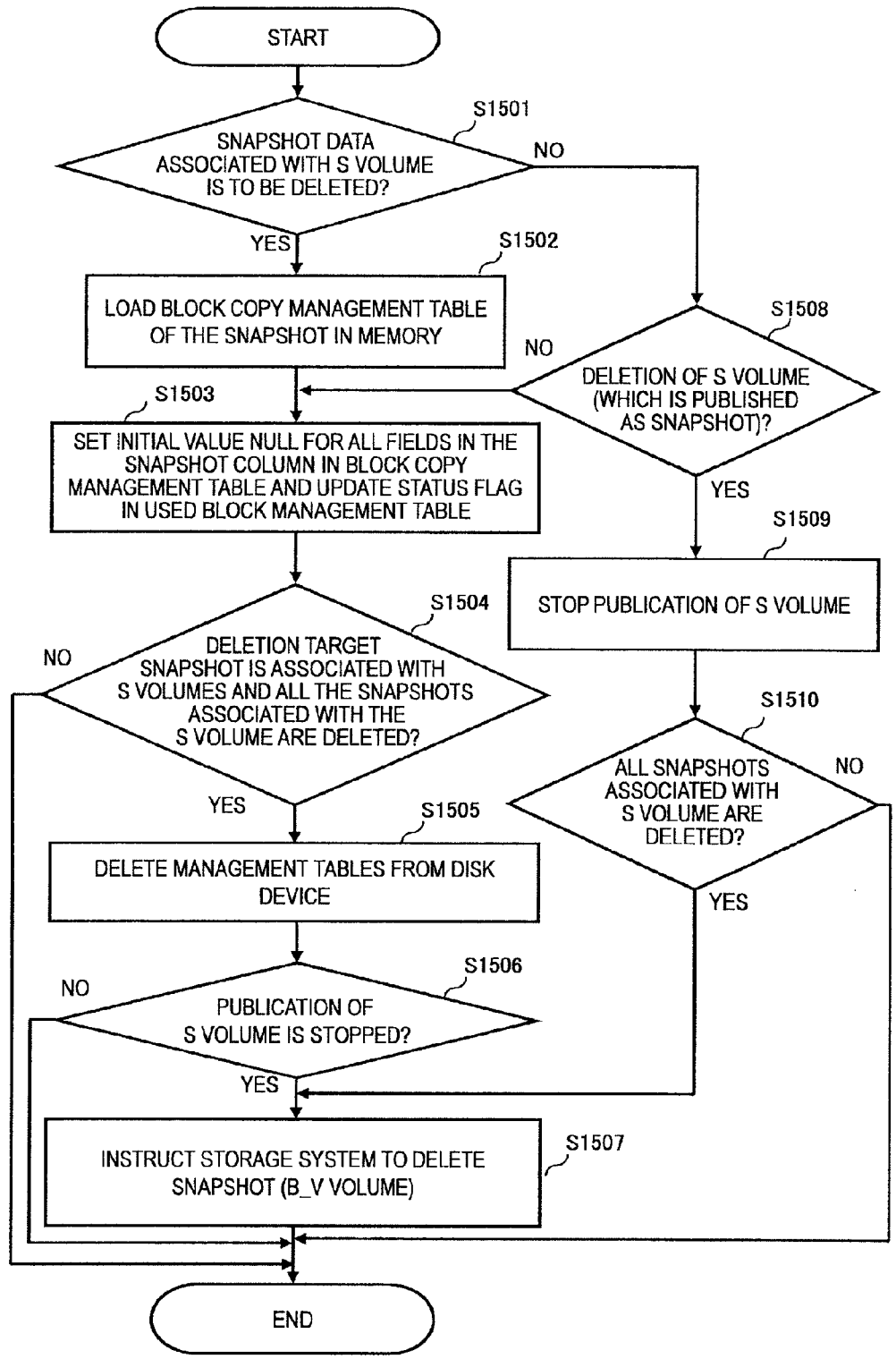
FIG. 15 is a flowchart showing an example of a snapshot deletion operation of the server in the present embodiment.

The snapshot deletion processing is explained mainly with reference to FIG. 15. FIG. 15 is a flowchart showing an example of the snapshot deletion operation of the server 101 in the present embodiment. Snapshot deletion is performed by initializing the snapshot column 702 in the block copy management table 301.

Firstly, the server snapshot program 201 checks whether the snapshot volume which the client requested to delete is a snapshot associated with a snapshot volume (one of the $S_1$ volume to the $S_m$ volume) which the storage system 111 provides or not (S1501). The check method may be the same as the method explained at the step S1401.

If the snapshot as the target of deletion is the snapshot associated with a snapshot volume (one of the $S_1$ volume to the $S_m$ volume) (S1501: YES), the server snapshot program 201 reads the block copy management table 301 associated with the snapshot volume (one of the $S_1$ volume to the $S_m$ volume) in the memory 103 (S1502).

If the snapshot volume as the target of deletion is not the snapshot associated with a snapshot volume (one of the $S_1$ volume to the $S_m$ volume) (S1501: NO), the server snapshot program 201 checks whether the snapshot volume which the client requested to delete is a snapshot volume (one of the $S_1$ volume to the $S_m$ volume) which the storage system 111 provides or not (S1508).

At the step S1508, if the target of the deletion request is any of the snapshot volumes (S volumes) (S1508: YES), the server snapshot program 201 stops the publication of this S volume to the client (S1509). The server snapshot program 201 further checks whether all the snapshot volumes (F_V volumes) associated with the above S volume are deleted or not (S1510).

If any of the snapshot volumes (F_V volumes) remains undeleted (S1510: NO), the server snapshot program 201 terminates the processing. If all the snapshot volumes (the F_V volumes) are deleted (S1510: YES), the server snapshot program 201 proceeds to the step S1507.

If the target of the deletion request is not any of the $S_1$ to the $S_m$ volumes at S1508 (S1508: NO), the target of the deletion request is a snapshot volume associated with the operation volume 601, and the block copy management table 301 is retained in the memory. The server snapshot program 201 skips the step S1502 and proceeds to the next step S1503.

At the step S1503, the server snapshot program 201 initializes all the fields in the snapshot column 702 which is the deletion target in the block copy management table 301. Furthermore, in case of deleting the snapshot associated with the operation volume 601, the server snapshot program 201 updates the value of the status flag 802 in the used block management table 302.

Specifically speaking, the server snapshot program 201 sets "NULL" which is an initial value for all the fields in the snapshot column 702 which is the deletion target in the block copy management table 301.

The data of the entry whose value of the field of the volume 703 is "−1" is copied to the block whose address is indicated by the field of the block 704 in the differential volume 602. The data becomes unnecessary by the deletion of the above snapshot if the data is not referred to by the other snapshots. In that case, for making this block available for copying other data, the server snapshot program 201 sets the value of the field of the status flag 802 in the block address 801 in the used block management table 302 to "0".

Next, the server snapshot program 201 checks whether the snapshot volume for which the deletion request is made is the snapshot associated with a snapshot volume (one of the $S_1$ volume to the $S_m$ volume) or not and, at the same time, whether the data of all the snapshots in the block copy management table 301 associated with the snapshot volume (one of the $S_1$ volume to the $S_m$ volume) is deleted or not (S1504).

Specifically speaking, the server snapshot program 201 checks whether all the fields of all the snapshot columns 702 in the block copy management table 301 are "NULL" or not.

If the snapshot volume for which the deletion request is made (the F_V volume) is the snapshot associated with a snapshot volume (one of the $S_1$ volume to the $S_m$ volume) and, at the same time, if all the snapshots in the block copy management table 301 associated with the snapshot volume (one of the $S_1$ volume to the $S_m$ volume) are deleted (S1504: YES), the block copy management table 301 and the used block management table 302 are unnecessary.

Therefore, the server snapshot program 201 also deletes the block copy management table 301 and the used block management table 302 from the disk (S1505). Subsequently, the server snapshot program 201 determines whether the publication of the corresponding S volume to the client is stopped or not (S1506). If the publication is not stopped (S1506: NO), the server snapshot program 201 terminates this processing. If the publication is stopped (S1506: YES), the server snapshot program 201 proceeds to the next step S1507.

The server snapshot program 201 instructs the storage system 111 via the storage processing program 202 to stop the publication of the snapshot volume (one of the $S_1$ volume to $S_m$ volume) to the server 101 and delete the snapshot volume (one of the $B\_V_1$ volume to $B\_V_m$ volume) in the storage system 111 (S1507).

If either "the snapshot volume for which the deletion request is made is the snapshot associated with a snapshot volume (any of the $S_1$ to $S_m$ volumes)" or "all the snapshots in the block copy management table 301 associated with the snapshot volume (one of the $S_1$ volume to $S_m$ volume) are deleted" is negative at the step S1504 (S1504: NO), the server snapshot program 201 skips the subsequent steps and terminates the processing.

It should be noted that the server snapshot program 201 releases the block copy management table 301 which was read into the memory 103 at the step S1502 from the memory 103 if the table 301 is not accessed for a specific period of time.

Although the embodiments of the present invention are explained as above, the present invention is not limited to the above-mentioned embodiments. Those skilled in the art can easily perform modification, addition, and conversion for the respective components in the above-mentioned embodiments within the spirit and scope of the present invention.

The configuration example of the above-mentioned information storage system includes two hierarchies which are a server which is a higher system and a storage system which is a lower system. However, the information storage system of the present invention is not limited to the configuration, and it is possible to apply the present invention to any type of configuration if the storage part includes the snapshot function.

For example, an aspect of the present invention can be realized by a server including the function of increasing the number of snapshots and a server including the snapshot function of the volumes provided by the storage system. In other cases, the information storage system of the present invention may also include the configuration in which the server including the function of increasing the number of snapshots and the storage system including the snapshot function are integrated.

In addition to this, the server system may also install both the function of increasing the number of snapshots of the present invention and the lower snapshot function. For preventing the complicated system configuration, the information storage system typically utilizes the two-hierarchy snapshot function, but may also utilize the snapshot function with three or more hierarchies.

The above-mentioned configuration includes a differential volume associated with each of the snapshot volumes S provided by the storage system. The information storage system of the present embodiment may also store the differential data associated with a plurality of (e.g. all of) snapshots in one differential volume. In one differential volume, each of the areas in which the differential data associated with each of the snapshot volumes is stored is a storage area of the differential data associated with each of the snapshots. The storage area may not have to be an area of sequential addresses.

In the above-mentioned configuration, the server snapshot program 201 updates the value of the volume column in the block copy management table 301 when the association destination of the differential volume F_D (snapshot volume F_V) is changed. For changing the information of association among volumes, the server snapshot program may also newly create a table instead of updating the values in the block copy management table 301. In the information storage system of the present invention, the storage system can include a plurality of storage subsystems and the same applies to the server system.

As explained above, the server 101 should preferably release the management tables which are not the access targets from the memory actively, but may not have to include this function. As the information for managing the higher snapshot volume F_V is stored in a plurality of management tables which are divided, the capacity of the memory required for managing the respective snapshot groups is smaller (compared with the total number of snapshots), and the processing efficiency of writing to and searching the management tables can be improved.

REFERENCE SIGN LIST

101: Server
102: Processor
103: Memory
104: Interface
105: Network interface
106: Management table
107: Management program
111: Storage
112: Processor
113: Memory
114: Interface
115: Disk device
116: Management table
117: Management program
201: Server snapshot program
202: Storage processing program
301: Block copy management table
302: Used block management table
401: Storage snapshot program
402: Server processing program
501: Block copy management table
502: Used block management table
601: Operation volume (F_P) (server)
602: Differential volume (F_D) (server)
603: Snapshot volume (F_V) (server)
701: Block address
702: Snapshot column
703: Volume
704: Block (address)
801: Block address
802: Status flag
901: Snapshot volume ($S_1$) (server)
902: Snapshot volume ($S_2$) (server)
903: Snapshot volume ($S_m$) (server)
911: Differential volume ($F\_D_1$) (server)
912: Differential volume ($F\_D_2$) (server)
913: Differential volume ($F\_D_m$) (server)
914: Differential volume ($F\_D_{m+1}$) (server)
921: Snapshot volume group ($F\_V_1$ to $F\_V_n$) (server)
922: Snapshot volume group ($F\_V_{n+1}$ to $F\_V_{2n}$) (server)
923: Snapshot volume group ($F\_V_{(m-1)*n+1}$ to $F\_V_{m*n}$) (server)
924: Snapshot volume group ($F\_V_{m*n+1}$ to $F\_V_{(m+1)*n}$) (server)
931: Snapshot volume ($B\_V_1$) (storage)
932: Snapshot volume ($B\_V_2$) (storage)
933: Snapshot volume ($B\_V_m$) (storage)
941: Operation volume (B_P) (storage)
951: Differential volume (B_D) (storage)

The invention claimed is:

1. An information storage system comprising:
a first differential data storage area which stores differential data due to update of a higher volume from a first point of time to a second point of time;
a lower snapshot manager which provides a lower snapshot at the second point of time of the higher volume;
first management information which associates the first differential data storage area with the lower snapshot;
a second differential data storage area which stores differential data due to update of the higher volume after the second point of time;
second management information which associates the second differential data storage area with the higher volume; and
a higher snapshot manager which acquires a plurality of generations of higher snapshots from the lower snapshot and data in the first differential data storage area with reference to the first management information, and acquires a plurality of generations of higher snapshots from data of the higher volume and data in the second differential data storage area with reference to the second management information.

2. An information storage system according to claim 1, wherein:
the first management information associates the first differential data storage area with the higher volume from the first point of time to the second point of time;
the higher snapshot manager, after the second point of time, changes the first management information to associate the first differential data storage area with the lower snapshot; and
the higher snapshot manager, after the changing of the first management information, associates the second differential data storage area with the higher volume by the second management information.

3. An information storage system according to claim 2, wherein:
the first management information is stored in a memory of the information storage system from the first point of time to the second point of time; and
the higher snapshot manager, after the second point of time, releases the first management information from the memory.

4. An information storage system according to claim 3, wherein the higher snapshot manager loads the first management information to the memory in a case a first higher snapshot associated with the lower snapshot by the first management information is accessed.

5. An information storage system according to claim 4, wherein the higher snapshot manager releases the first management information from the memory in a case that the first management information stored in the memory is not accessed during a predetermined period of time.

6. An information storage system according to claim 5, wherein:
the higher snapshot manager loads the first management information to the memory in a case that the higher snapshot manager receives a deletion request for the first higher snapshot;
the higher snapshot manager deletes information regarding the first higher snapshot from the first management information in the memory; and
the higher snapshot manager releases the first management information from the memory in a case that the first management information is not accessed during a predetermined period of time.

7. An information storage system according to claim 6, wherein the higher snapshot manager instructs the lower snapshot manager to delete the lower snapshot in a case that information regarding all higher snapshots included in the first management information is deleted.

8. An information storage system according to claim 7, wherein the higher snapshot manager repeats storing differential data of the higher volume in a differential data storage area and changing an association destination of the differential data storage area from the higher volume to a lower snapshot of the higher volume to increase the number of snapshot of the higher volume.

9. An information storage system according to claim 8, wherein:
the higher snapshot manager instructs the lower snapshot manager to provide the lower snapshot at the second point of time of the higher volume;
the lower snapshot manager acquires the lower snapshot and provides the lower snapshot to the higher snapshot manager in accordance with the instruction; and
the higher snapshot manager associates the first differential data storage area associated with the higher volume with the provided lower snapshot.

10. An information storage system according to claim 9 comprising a server system and a storage system, wherein:
the server system includes the memory and the higher snapshot manager;
the storage system includes the lower snapshot manager and a non-volatile storage area;
the higher volume is a virtual volume of a lower volume provided by the storage system; and
the non-volatile storage area includes the first differential data storage area and the second differential data storage area.

11. A snapshot acquisition method in an information storage system comprising the steps of:
storing differential data due to update of a higher volume from a first point of time to a second point of time in a first differential data storage area;
creating first management information which associates the first differential data storage area with a lower snapshot at the second point of time of the higher volume and storing the first management information in a memory;
storing differential data due to update of the higher volume after the second point of time in a second differential data storage area;
creating second management information which associates the second differential data storage area with the higher volume and storing the second management information in the memory;
acquiring a plurality of generations of higher snapshots from the lower snapshot and data in the first differential data storage area with reference to the first management information; and
acquiring a plurality of generations of higher snapshots from data of the higher volume and data in the second differential data storage area with reference to the second management information.

12. A snapshot acquisition method according to claim 11, wherein the first management information is released from the memory after the second point of time.

13. A snapshot acquisition method according to claim 11 comprising the steps of:
storing the differential data from the first point of time to the second point of time in the first differential data storage area associated with the higher volume;
changing an association destination of the first differential data storage area storing the differential data from the higher volume to the lower snapshot; and
associating the second differential data storage area with the higher volume after the changing the association.

14. A snapshot acquisition method according to claim 11 comprising the steps of:
loading the first management information to the memory in a case a first higher snapshot associated with the lower snapshot by the first management information is accessed; and
releasing the first management information from the memory in a case that the first management information stored in the memory is not accessed during a predetermined period of time.

15. A computer-readable non-transitory storage medium for storing instructions to allow a server system including a processor and a memory to perform processing for acquiring snapshots, wherein the processing comprising:
storing differential data of a higher volume from a first point of time to a second point of time in a first differential data storage area;
creating first management information which associates the first differential data storage area with a lower snapshot at the second point of time of the higher volume and storing the first management information in the memory;
storing differential data of the higher volume after the second point of time in a second differential data storage area;
creating second management information which associates the second differential data storage area with the higher volume and storing the second management information in the memory;
acquiring a plurality of generations of higher snapshots from the lower snapshot and data in the first differential data storage area with reference to the first management information; and
acquiring a plurality of generations of higher snapshots from data of the higher volume and data in the second differential data storage area with reference to the second management information.

* * * * *